(12) United States Patent
Kawai et al.

(10) Patent No.: US 9,926,967 B2
(45) Date of Patent: Mar. 27, 2018

(54) COUPLING STRUCTURE FOR COUPLING TWO MEMBERS

(71) Applicant: TOYOTA JIDOSHA KABUSHIKI KAISHA, Toyota-shi, Aichi-ken (JP)

(72) Inventors: Hitoshi Kawai, Seto (JP); Shori Kato, Tajimi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 29 days.

(21) Appl. No.: 15/138,747

(22) Filed: Apr. 26, 2016

(65) Prior Publication Data
US 2016/0369829 A1 Dec. 22, 2016

(30) Foreign Application Priority Data
Jun. 22, 2015 (JP) ................................. 2015-124517

(51) Int. Cl.
*F16B 21/18* (2006.01)
*F16H 61/36* (2006.01)
*F16C 1/14* (2006.01)

(52) U.S. Cl.
CPC .............. *F16C 1/14* (2013.01); *F16B 21/186* (2013.01)

(58) Field of Classification Search
CPC .......... F16H 61/36; F16B 17/00; F16B 21/00; F16B 21/10; F16B 21/12; F16B 21/125; F16B 21/16; F16B 21/18; F16B 2021/14; Y10T 403/58; Y10T 403/587
See application file for complete search history.

(56) References Cited

U.S. PATENT DOCUMENTS

| | | | | |
|---|---|---|---|---|
| 3,625,554 A | * | 12/1971 | Mottais | B23B 31/113 403/14 |
| 5,518,332 A | * | 5/1996 | Katoh | F16B 21/16 285/305 |
| 6,340,265 B1 | * | 1/2002 | Suzuki | F16C 1/105 403/299 |
| 8,328,455 B2 | * | 12/2012 | Na | F16C 1/14 403/146 |

(Continued)

FOREIGN PATENT DOCUMENTS

| | | | | |
|---|---|---|---|---|
| EP | 0 813 002 | * | 12/1997 | ............. F16H 59/04 |
| FR | 2 887 941 | * | 1/2007 | ............. F16B 39/04 |

(Continued)

*Primary Examiner* — Michael P Ferguson
(74) *Attorney, Agent, or Firm* — Oliff PLC

(57) ABSTRACT

A coupling structure, including: a pair of slots extending in a circumferential direction of a sleeve portion of a first member; a circumferential groove formed in an outer circumference of a shaft portion of a second member; and a coupling member configured such that a part thereof is fitted into the circumferential groove through the slots for coupling the sleeve portion and the shaft portion so as to be rotatable relative to each other, wherein the coupling member is rotated while being elastically deformed, so as to disengage the coupling member from the circumferential groove for uncoupling the first member and the second member from each other, and wherein an extending portion of the coupling member has a length so designed as to prohibit its distal end from getting into the circumferential groove even when the coupling member excessively rotates and the extending portion accordingly engages one of the slots.

8 Claims, 8 Drawing Sheets

(56) References Cited

U.S. PATENT DOCUMENTS

2010/0251847 A1* 10/2010 Gordy ................ F16C 1/14
  74/502.6
2015/0233414 A1   8/2015 Koontz

FOREIGN PATENT DOCUMENTS

| GB | 867381 | * | 5/1961 | ............. F16B 21/18 |
| JP | 2008-045594 A | | 2/2008 | |
| WO | 2014/059303 A1 | | 4/2014 | |

* cited by examiner

COUPLING STRUCTURE FOR COUPLING TWO MEMBERS

CROSS REFERENCE TO RELATED APPLICATION

The present application claims priority from Japanese Patent Application No. 2015-124517, which was filed on Jun. 22, 2015, the disclosure of which is herein incorporated by reference in its entirety.

BACKGROUND

Technical Field

The following disclosure relates to a coupling structure for coupling a first member having a sleeve portion and a second member having a shaft portion.

Description of Related Art

In various machines and the like, there exists a portion at which a first member having a sleeve portion and a second member having a shaft portion are connected such that, in a state in which the shaft portion is fitted in the sleeve portion, the shaft portion and the sleeve portion are coupled to each other. For instance, JP-A-2008-045594 discloses a manual transmission for a vehicle. For linking a shift and select shaft which is one constituent element of the manual transmission and a shift cable whose one end is connected to an operation member, a cable end (connecting eye member) provided at the other end of the shift cable and an outer lever extending from a distal end of the shift and select shaft in a radial direction are connected. The cable end and the outer lever are connected such that, in a state in which the shaft portion (an outer lever pin) fixed to the outer lever is fitted in the sleeve portion of the cable end, the sleeve portion and the shaft portion are coupled to each other.

SUMMARY

In the thus configured coupling structure in which the first member having the sleeve portion and the second member having the shaft portion are coupled, the two members normally need to be coupled so as not to be easily uncoupled from each other. On the other hand, in an instance where the two members need to be uncoupled from each other for repairs and maintenance, it is desirable to easily uncouple the two members from each other. It is therefore an object to provide a coupling structure for coupling the first member having the sleeve portion and the second member having the shaft portion in which workability of uncoupling the two members is improved while enabling the two members to be coupled with high reliability.

An aspect of the disclosure relates to a coupling structure for coupling a first member having a sleeve portion and a second member having a shaft portion in a state in which the shaft portion is fitted in the sleeve portion, including:

a pair of slots each of which extends in a circumferential direction of the sleeve portion and which are opposed to each other with an axis of the sleeve portion interposed therebetween;

a circumferential groove formed in an outer circumference of the shaft portion; and a coupling member configured such that a part thereof is fitted into the circumferential groove through the slots in a state in which the slots and the circumferential groove are positioned relative to each other, for coupling the sleeve portion and the shaft portion so as to be rotatable relative to each other, wherein the coupling member is formed by bending a wire and including (A) a pair of first and second engaging portions extending in parallel to each other and configured to respectively engage the slots, (B) a connecting portion connecting one end of the first engaging portion and one end of the second engaging portion, which one ends are diagonally opposed to each other, the connecting portion extending from the one end of the second engaging portion toward the other end of the first engaging portion so as to surround the first engaging portion for connecting the one end of the second engaging portion and the one end of the first engaging portion, and (C) an extending portion extending straight from the other end of the second engaging portion toward the one end of the first engaging portion, wherein the coupling structure enables the first member and the second member to be uncoupled from each other by rotating the coupling member with respect to the sleeve portion while elastically deforming the coupling member, so as to disengage the coupling member from the circumferential groove, and wherein the extending portion has a length so designed as to prohibit a distal end thereof from getting into the circumferential groove even when the coupling member excessively rotates and the extending portion accordingly engages one of the slots.

For uncoupling the first member and the second member from each other, the coupling member is rotated. In this instance, if the extending portion has a length so designed as to allow a distal end thereof to get in the circumferential groove when the coupling member is excessively rotated with respect to the sleeve portion, the distal end of the extending portion gets in a space defined by: portions of an inner circumferential surface of the sleeve portion (at which the slots are not formed); and the circumferential groove of the shaft portion. This makes it very difficult to uncouple the first member and the second member from each other. In contrast, the coupling structure constructed as described above has the extending portion whose length is so designed as to prohibit the distal end thereof from getting into the circumferential groove, so that the present coupling structure is free from such a disadvantage.

BRIEF DESCRIPTION OF THE DRAWINGS

The objects, features, advantages, and technical and industrial significance of the present disclosure will be better understood by reading the following detailed description of one embodiment, when considered in connection with the accompanying drawings, in which.

DETAILED DESCRIPTION OF THE EMBODIMENT

Figure 1:
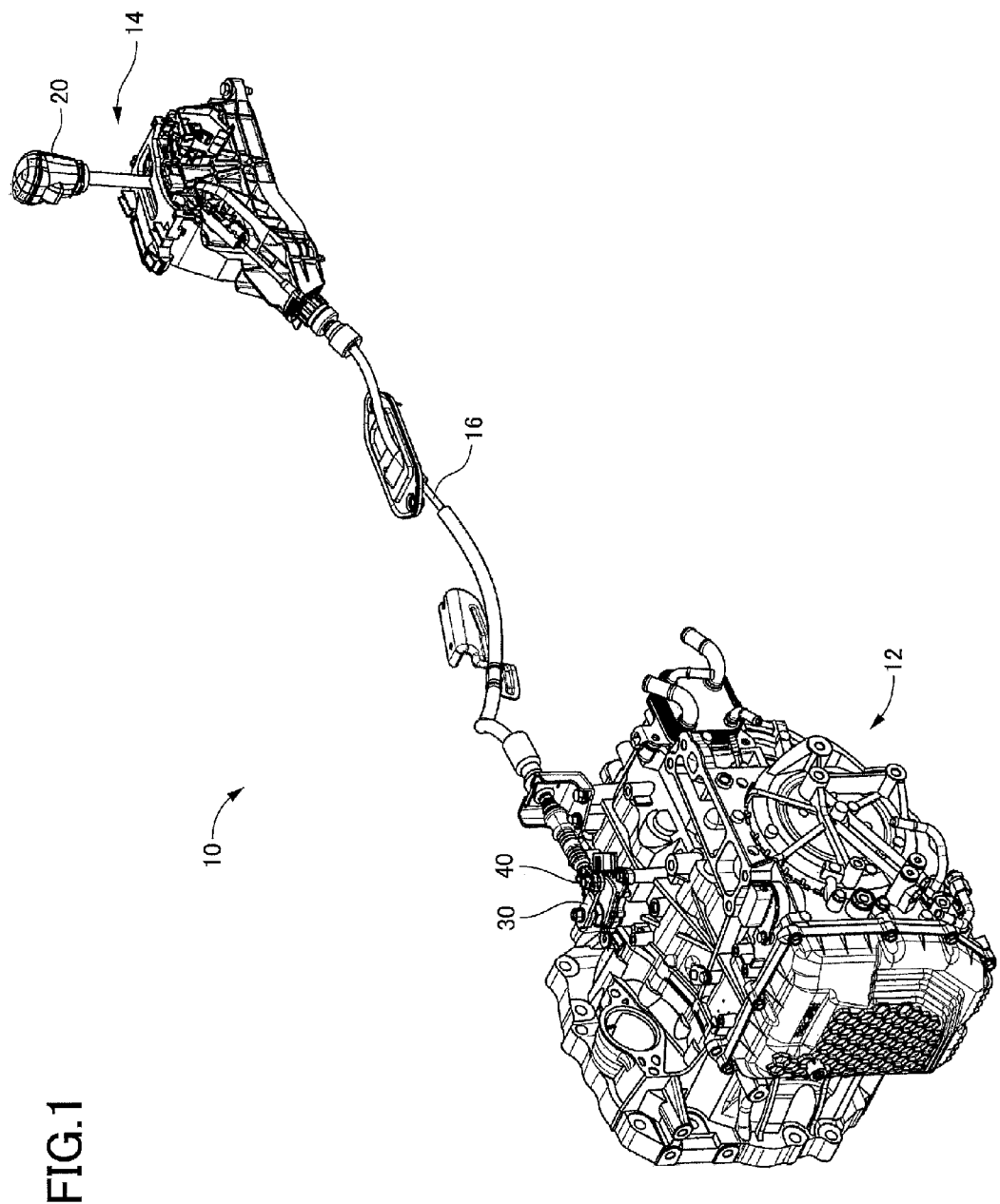
FIG. 1 is a perspective view of a transmission for a vehicle in which a coupling structure according to one embodiment of this invention is employed.

Referring to the drawings, there will be described in detail one embodiment. It is to be understood that the following embodiment is described only by way of example and the disclosure may be otherwise embodied with various changes and modifications based on the knowledge of those skilled in the art.

FIG. 1 shows a transmission 10 in which a coupling structure according to the present embodiment is used. The transmission 10 is the so-called automatic transmission and includes a transaxle 12 including an automatic transmission, a selector 14, as an operation member, to be operated by a vehicle driver for switching a running state of the vehicle, and a select cable 16 for linking the transaxle 12 and the selector 14.

The selector 14 is configured such that a select lever 20 is selectively placed), by a driver's operation, in one of the following four ranges: P (parking); R (reverse); N (neutral); and D (drive). In accordance with the range position of the select lever 20, a state from input to output of a drive force in the automatic transmission of the transaxle 12 is mechanically switched through the select cable 16. While a detailed explanation and illustration are not given here, the transaxle 12 is configured such that a select shaft 26, as an operation input shaft, rotatably held by a housing 24 is rotated, whereby the transaxle 12 is selectively placed in one of the following states: a state (P range) in which an output shaft of the automatic transmission (on the drive side) is mechanically fixed; a state (R range) in which an input shaft and the output shaft are connected for permitting a vehicle to reverse; a state (N range) in which no force is transmitted between the input shaft and the output shaft; and a state (D range) in which the automatic transmission function works.

Figure 2:
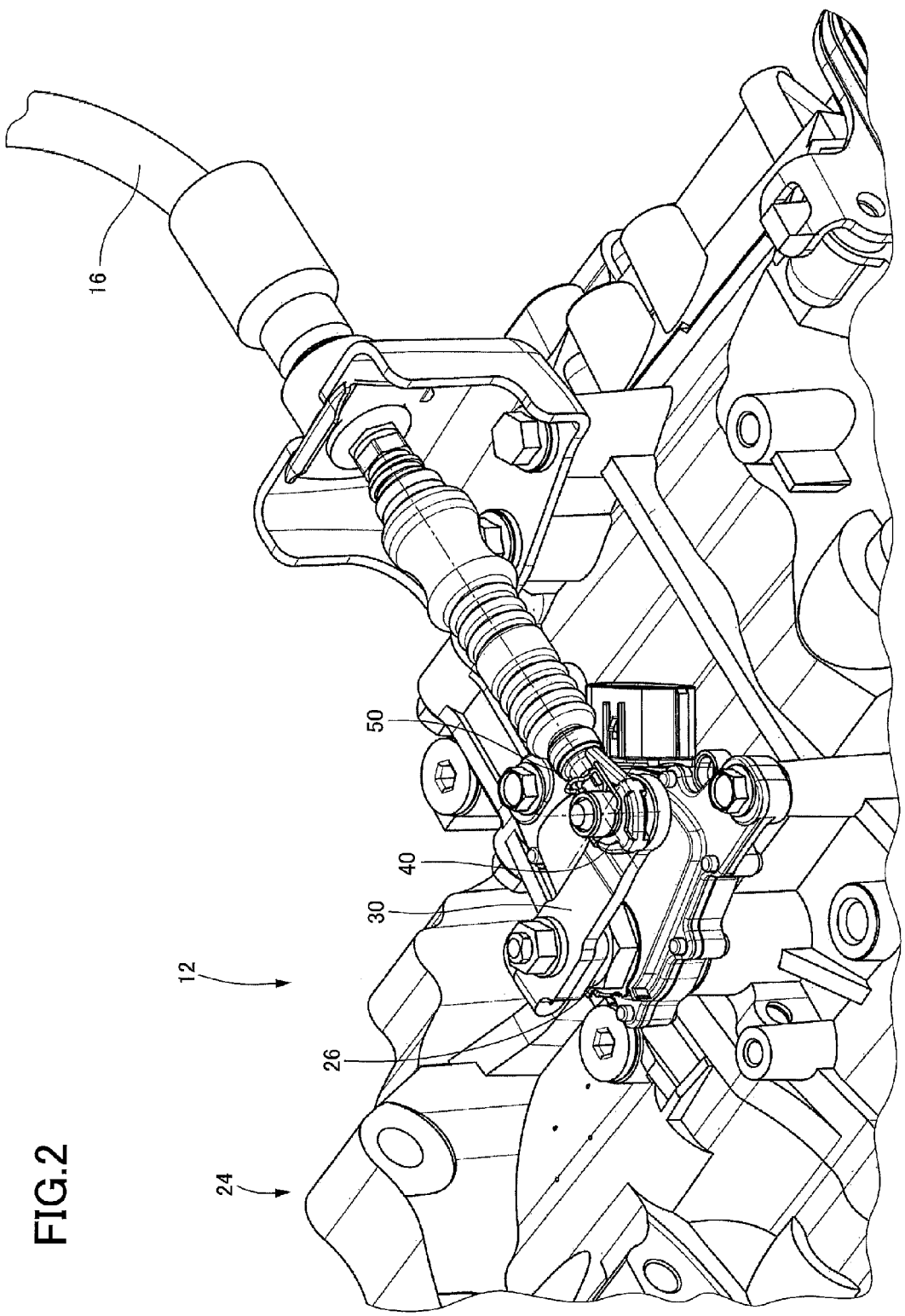
FIG. 2 is an enlarged view of a portion around the coupling structure in FIG. 1.
Figure 3:
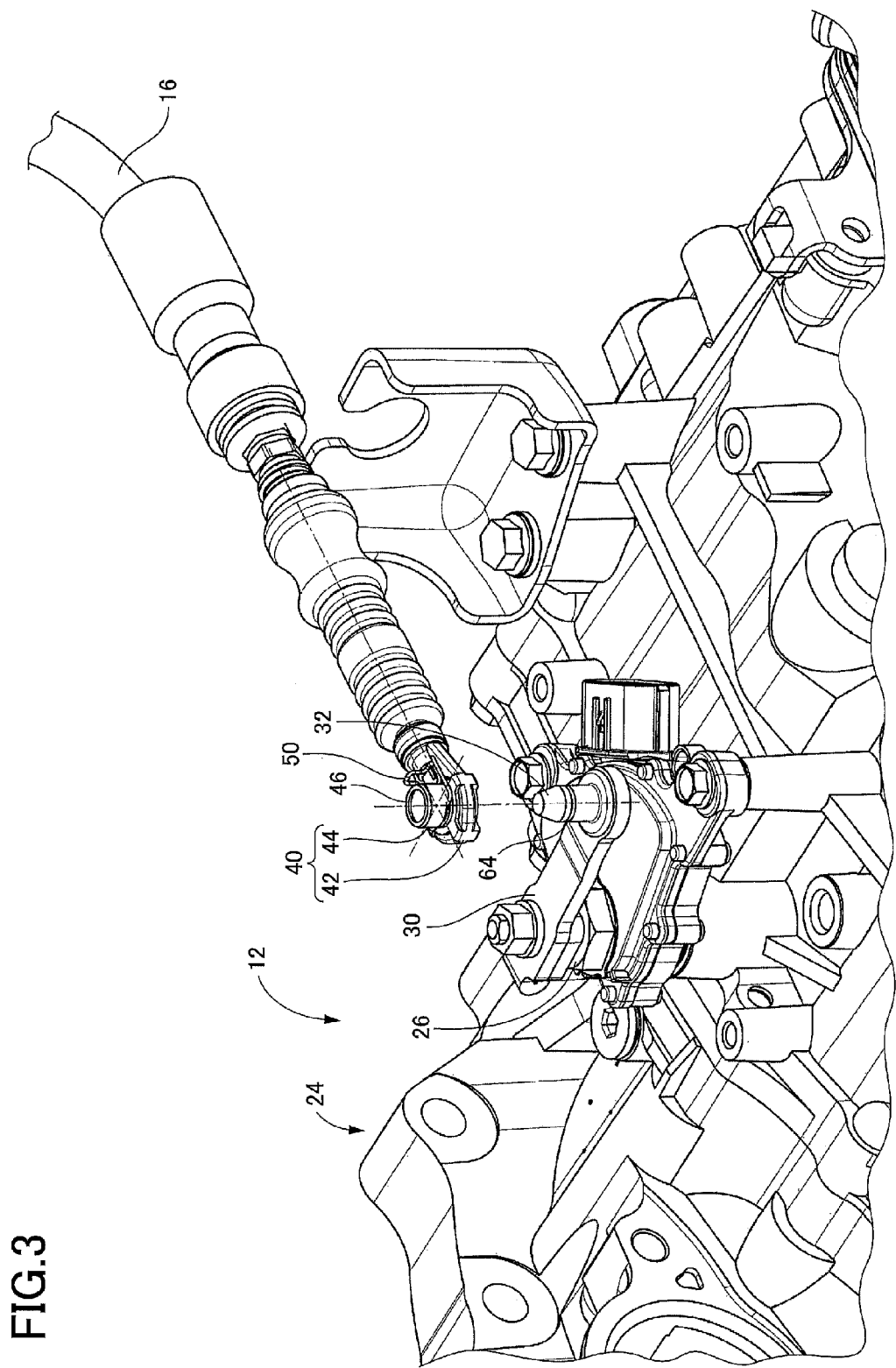
FIG. 3 is a view showing a state in which coupling of two members by the coupling structure is released.

The coupling structure according to the present embodiment is used at a portion of the transmission 10 at which the select cable 16 and the select shaft 26 are connected. As shown in FIGS. 2 and 3, the select shaft 26 is rotatably held by the housing 24 such that its one end portion protrudes outwardly from the housing 24. An outer lever 30 is fixed to the one end portion of the select shaft 26 so as to extend in a direction orthogonal to the select shaft 26. To a distal end of the outer lever 30, an outer lever pin 32 is provided so as to extend upright.

A cable end 40 is fixed to a distal end of the select cable 16 that extends from the selector 14. The cable end 40 includes a generally annular main body portion 42 and a sleeve portion 44 extending upward from the main body portion 42. The sleeve portion 44 has an outer diameter smaller than that of the main body portion 42, whereby the cable end 40 has a stepped shape. The sleeve portion 44 and the main body portion 42 define a through-hole 46 that penetrates therethrough in the up-down direction.

In a state in which the outer lever pin 32 is fitted in the through-hole 46 of the cable end 40, the outer lever pin 32 and the sleeve portion 44 of the cable end 40 are coupled by a clip 50 as a coupling member, so at to be rotatable relative to each other. That is, the outer lever 30 and the cable end 40 are coupled to each other. When the driver operates the selector 14, the select cable 16 is pulled or pushed in accordance with a movement of the select lever 20, thereby causing the outer lever pin 32 to be moved with the cable end 40. That is, the outer lever 30 is rotated, and the select shaft 26 is rotated about its axis. The state in the automatic transmission is switched in accordance with the rotational position of the select shaft 26, as explained above.

Figure 4:
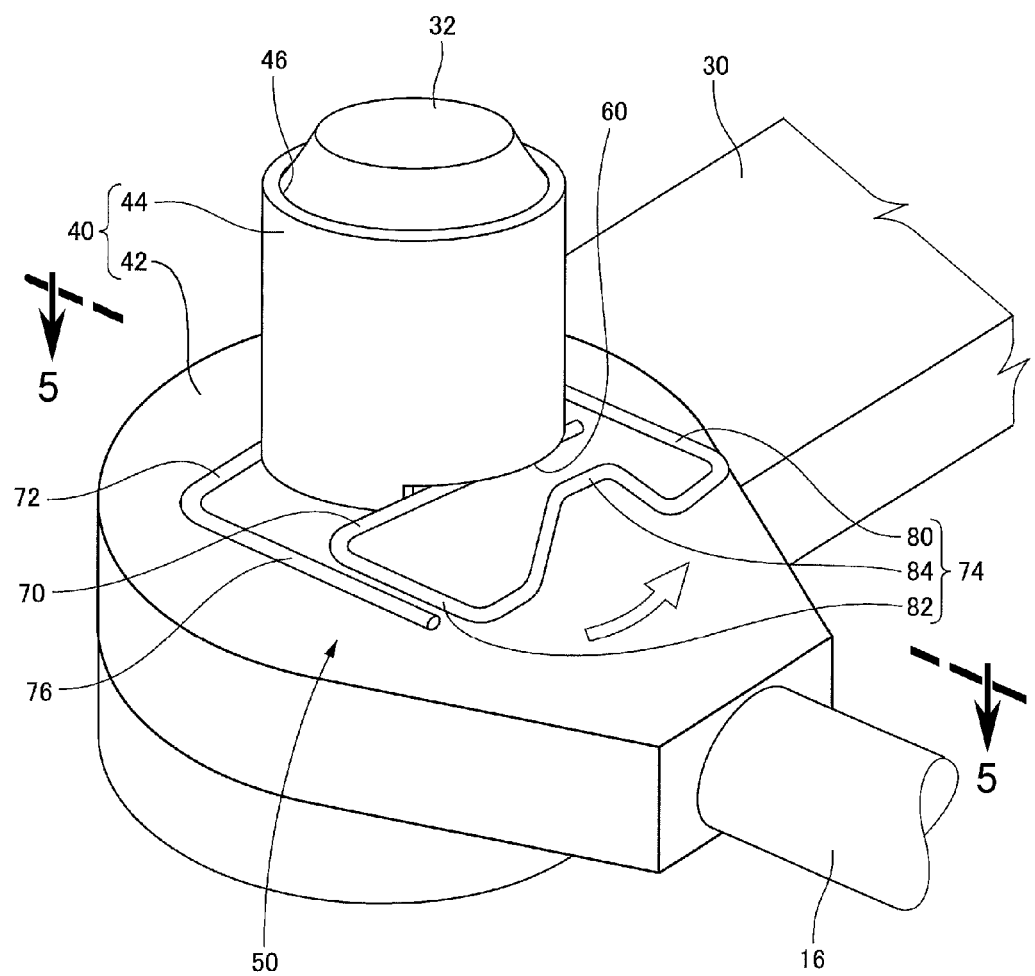
FIG. 4 is an enlarged perspective view of the coupling structure.
Figure 5:
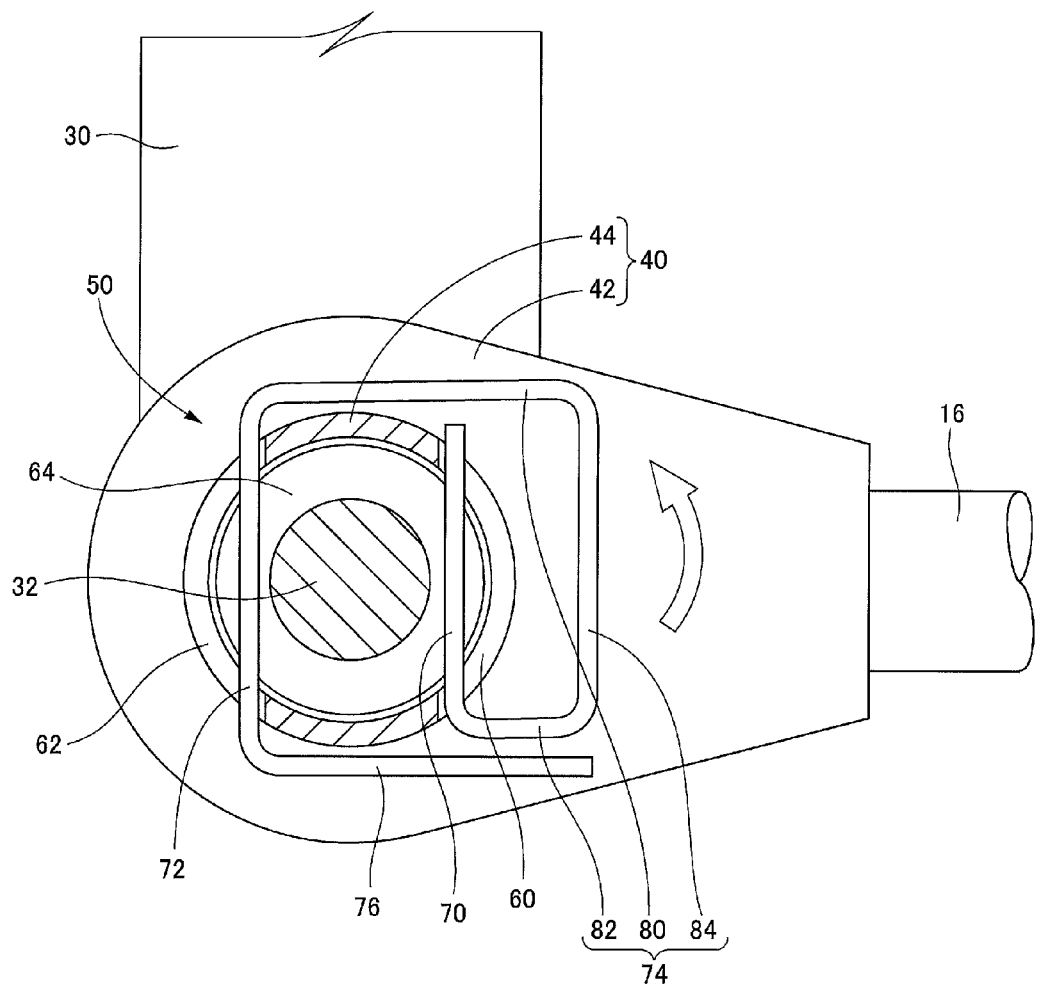
FIG. 5 is a plane cross-sectional view of the coupling structure taken along line 5-5 of FIG. 4.

The coupling structure is configured to couple the cable end 40 as a first member and the outer lever 30 as a second member by coupling the sleeve portion 44 of the cable end 40 and the outer lever pin 32, as a shaft portion, provided at the outer lever 30. Referring to FIGS. 4 and 5, the coupling structure will be explained in detail. FIGS. 4 and 5 show a state in which the cable end 40 and the outer lever 30 are firmly coupled by the coupling structure.

The sleeve portion 44 of the cable end 40 has a pair of slots 60, 62. The slots 60, 62 extend in the circumferential direction of the sleeve portion 44 and are opposed to each other with the axis of the sleeve portion 44 interposed therebetween. The outer lever pin 32 has a circumferential groove 64 that extends over the entire circumference of the outer lever pin 32. In a state in which the cable end 40 is fitted onto the outer lever pin 32, the slots 60, 62 and the circumferential groove 64 are located at the same height position. In this state, the clip 50 is inserted through the slots 60, 62 and is fitted in the circumferential groove 64, whereby the sleeve portion 44 and the outer lever pin 32 are undetachably coupled.

The clip 50 is formed by bending a wire and includes a pair of engaging portions 70, 72 extending in parallel to each other and configured to engage the respective slots 60, 62, a connecting portion 74 connecting the engaging portions 70, 72, and an extending portion 76 extending from one end of the second engaging portion 72. In the following explanation, the engaging portions 70, 72 will be respectively referred to as a first engaging portion 70 and a second engaging portion 72 where appropriate.

The connecting portion 74 of the clip 50 connects one end (a lower end in FIG. 5) of the first engaging portion 70 and one end (an upper end in FIG. 5) of the second engaging portion 72. The connecting portion 74 extends from the one end of the second engaging portion 72 toward the first engaging portion 70 at a substantially right angle, and reaches the one end of the first engaging portion 70 so as to surround the first engaging portion 70, the one ends being diagonally opposed to each other. Specifically, the connecting portion 74 of the clip 50 is shaped to have: a second-engaging-portion-side connecting portion 80 extending from the one end of the second engaging portion 72 toward the other end (an upper end in FIG. 5) of the first engaging portion 70 and further extending beyond the other end of the first engaging portion 70; a first-engaging-portion-side connecting portion 82 extending from the one end of the first engaging portion 70 so as to be in parallel with the second-engaging-portion-side connecting portion 80; and an intermediate portion 84 connecting a distal end of the second-engaging-portion-side connecting portion 80 and a distal end of the first-engaging-portion-side connecting portion 82. As shown in FIG. 4, the intermediate portion 84 is shaped to protrude upward, specifically, protrude in a direction in which the axis of the sleeve portion 44 extends, so as to function as a protruding portion. The extending portion 76 extends from the other end (a lower end in FIG. 5) of the second engaging portion 72 toward the one end of the first engaging portion 70 and has a length that reaches the distal end of the first-engaging-portion-side connecting portion 82.

In the thus formed clip 50, the first engaging portion 70 is inserted in the slot 60 so as to engage the circumferential groove 64 and the second engaging portion 72 is inserted in the slot 62 so as to engage the circumferential groove 64. Consequently, the outer lever pin 32 and the sleeve portion 44 are prohibited from axially moving relative to each other and are allowed to rotate relative to each other. That is, the outer lever pin 32 and the sleeve portion 44 are coupled by the clip 50 so as to be rotatable relative to each other. Thus, the coupling structure is constituted by the pair of slots 60, 62 formed in the sleeve portion 44, the circumferential groove 64 formed in the outer lever pin 32, and the clip 50, so as to couple the cable end 40 as the first member and the outer lever 30 as the second member.

Figure 6:
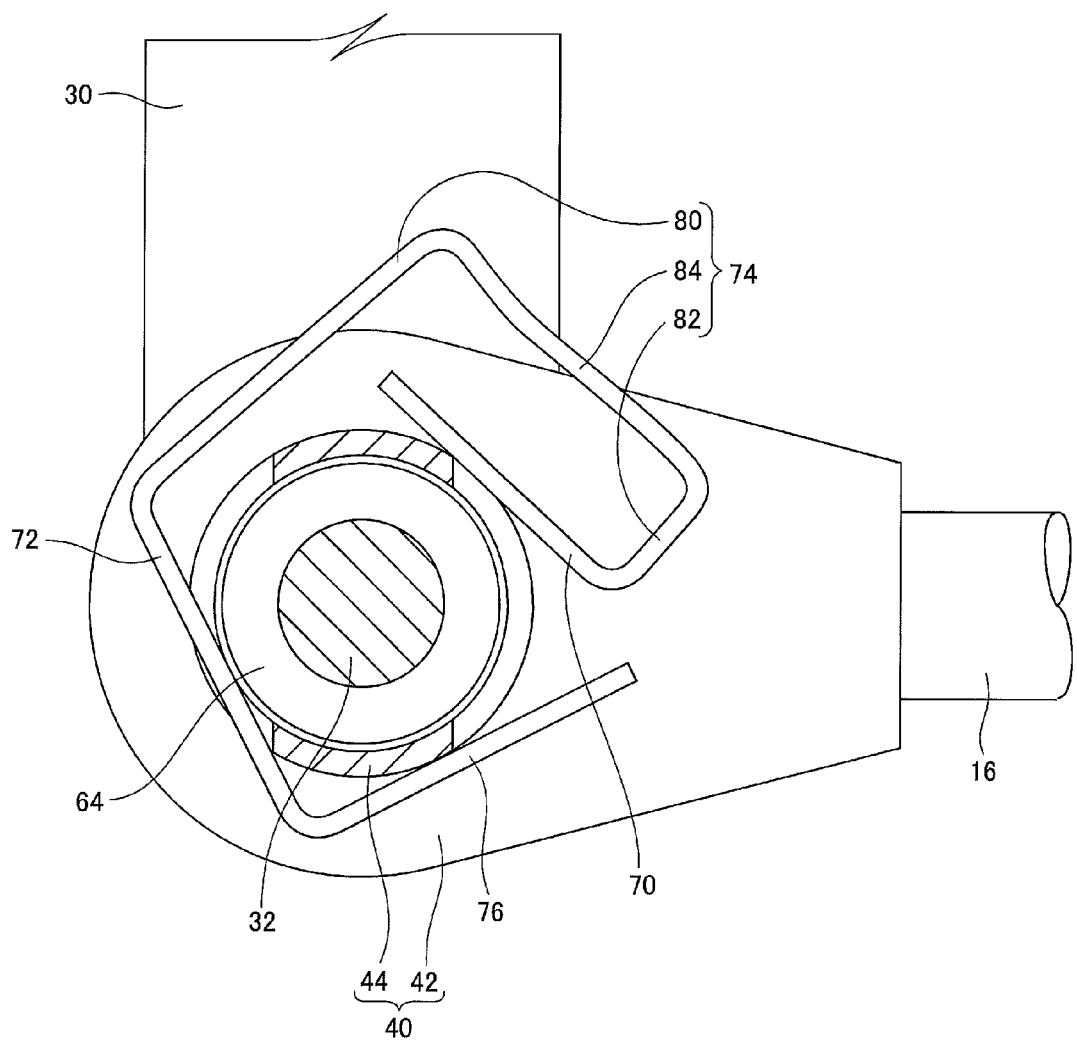
FIG. 6 is a plane cross-sectional view of the coupling structure shown in FIG. 5 in a state in which a coupling member is rotated so as to permit the two members to be uncoupled from each other.

Next, releasing of the coupling of the cable end 40 and the outer lever 30 by the coupling structure, namely, uncoupling of the cable end 40 and the outer lever 30, will be explained. For uncoupling the cable end 40 and the outer lever 30 from each other, the clip 50 is rotated clockwise or counterclockwise along the circumferential direction of the sleeve portion 44 while being elastically deformed. FIG. 6 shows a state in which the clip 50 is rotated in a direction indicated by the arrow in FIGS. 4 and 5. In this state, the engaging portions 70, 72 of the clip 50 contact the outer circumferential surface of the sleeve portion 44. That is, the engaging portions 70, 72 are disengaged from the circumferential groove 64 and are not in engagement with the circumferential groove 64. In other words, the outer lever pin 32 and the sleeve portion 44 are axially movable relative to each other, and the cable end 40 can be detached from the outer lever 30 by lifting up the cable end 40 together with the clip 50.

Figure 7A:
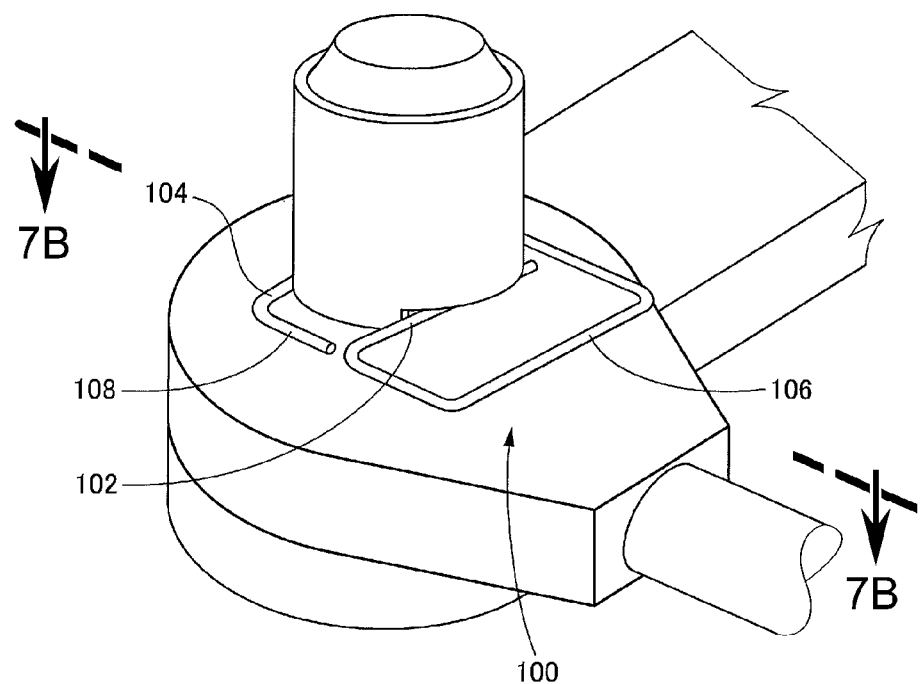
FIG. 7A is a perspective view and FIG. 7B is a plane cross-sectional view of a coupling structure according to a comparative example taken along line 7B-7B of FIG. 7A.
Figure 7B:
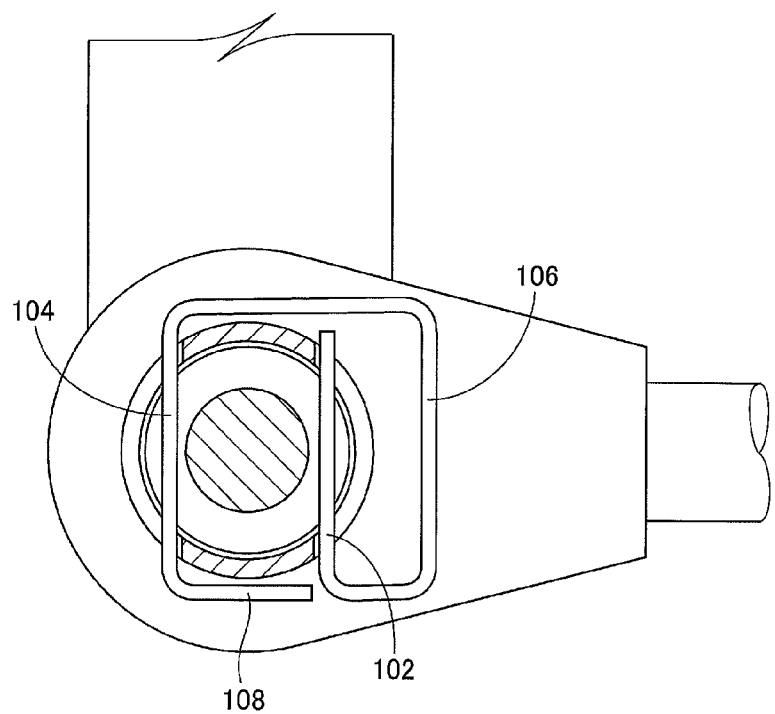

FIGS. 7A and 7B show a coupling structure according to a comparative example. The coupling structure of the comparative example differs from the coupling structure of the present embodiment in the shape of a clip 100. The clip 100 has a shape similar to that of the clip 50, namely, the clip 100 includes a pair of engaging portions 102, 104, a connecting portion 106, and an extending portion 108. However, the connecting portion 106 of the clip 100 does not have the protruding portion, and the clip 100 is formed by bending a wire on one plane. Further, the extending portion 108 of the clip 100 has a length shorter than that of the extending portion 76 of the clip 50 of coupling structure according to the present embodiment.

For uncoupling the cable end 40 and the outer lever 30 from each other, the clip 100 is plastically deformed so as to enlarge a distance between the pair of engaging portions 102, 104, thereby detaching the clip 100 from the sleeve portion 44. Consequently, the clip 100 cannot be reused and needs to be replaced with a new one for again coupling the cable end 40 and the outer lever 30.

According to the coupling structure of the present embodiment, the cable end 40 and the outer lever 30 are uncoupled from each other by rotating the clip 50 with respect to the sleeve portion 44 and disengaging the clip 50 from the circumferential groove 64. Consider a case where the clip is rotated with respect to the sleeve portion 44 for uncoupling the cable end 40 and the outer lever 30 from each other in the coupling structure of the comparative example, as in the coupling structure of the present embodiment. As described above, the clip 100 of the coupling structure of the comparative example is formed by bending a wire on one plane. Therefore, the clip 100 has no portion to be pushed or grasped by a worker, and it is relatively difficult to rotate the clip 100 to such an extent that the clip 100 is disengaged from the circumferential groove 64.

Even if the clip 100 is rotated, there may be a risk that the clip 100 is not only disengaged from the circumferential groove 64, but also rotates to an excessive extent. In an instance where the clip 100 is excessively rotated with respect to the sleeve portion 44, the distal end of the extending portion 108 gets into a space defined by: portions of the inner circumferential surface of the sleeve portion 44 at which the slots 60, 62 are not formed; and the circumferential groove 64 of the outer lever pin 32, as shown in FIG. 8B. In such a state, it is difficult to rotate the clip 100 in a direction to move it back to its original position and to plastically deform the clip 100 for detaching the clip 100 from the sleeve portion 44.

In contrast, according to the coupling structure of the present embodiment, the clip 50 has the protruding portion (the intermediate portion 84). It is thus possible for the worker to rotate the clip 50 while pushing the protruding portion, so that the cable end 40 and the outer lever 30 are easily uncoupled from each other. Further, the clip 50 has lowered rigidity at the connecting portion 74 owing to the presence of the protruding portion. Specifically, the clip 50 is elastically deformed such that the intermediate portion 84 is twisted as shown in FIG. 6, so that the distance between the engaging portions 70, 72 is enlarged. Consequently, the worker can easily rotate the clip 50.

Figure 8A:
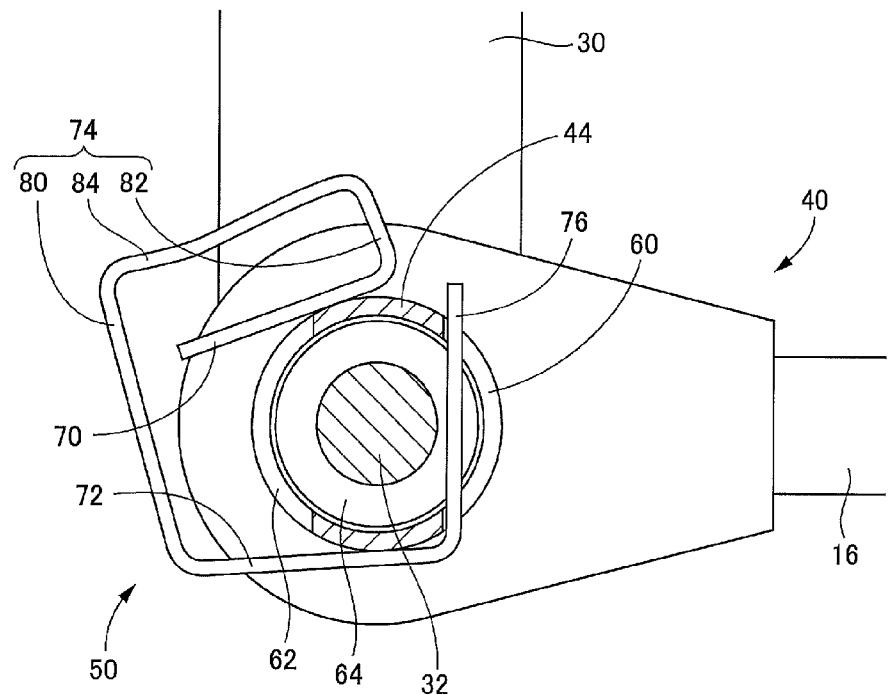
FIG. 8A is a plane cross-sectional view of the coupling structure according to the embodiment of the invention and FIG. 8B is a plane cross-sectional view of the coupling structure according to the comparative example, both of FIGS. 8A and 8B showing a state in which the coupling member is excessively rotated.
Figure 8B:
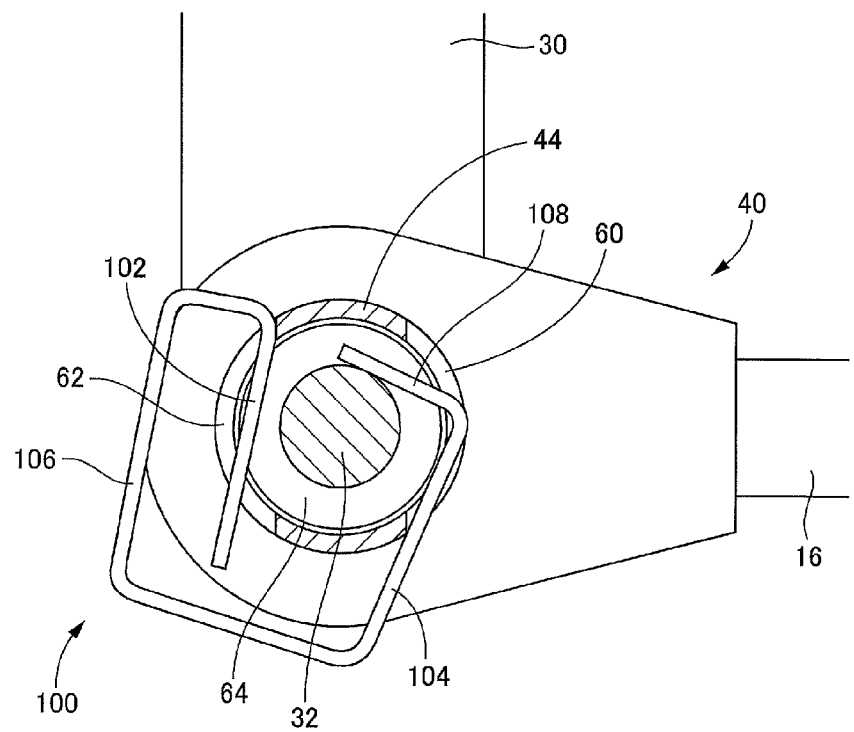

According to the coupling structure of the present embodiment, even if the clip 50 is excessively rotated with respect to the sleeve portion 44, the extending portion 76 engages the slot 60 (or the slot 62 when rotated in a direction opposite to the direction indicated by the arrow in FIGS. 4 and 5), as shown in FIG. 8A, and the distal end of the extending portion 76 does not get into the circumferential groove 64. Consequently, in an instance where the clip 50 is excessively rotated with respect to the sleeve portion 44, the clip 50 is easily rotated in an opposite direction back to a state in which the clip 50 does not engage the circumferential groove 64.

The portion at which the cable end 40 and the outer lever 30 are coupled is located in an engine room, and various components are disposed around the portion. It is sometimes required to uncouple the cable end 40 and the outer lever 30 not only when the transmission 10 is repaired but also when the components around the portion are repaired. Because the portion at which the cable end 40 and the outer lever 30 are coupled is present in such a location, the work of uncoupling the cable end 40 and the outer lever 30 is relatively difficult. According to the coupling structure of the present embodiment, however, the workability in uncoupling the cable end 40 and the outer lever 30 is enhanced.

The coupling structure of the present embodiment is used at the portion at which the automatic transmission of a vehicle and the select cable 16 extending from the selector 14 are coupled. For instance, the coupling structure may be used at a portion at which a manual transmission is coupled to a shift cable and a select cable extending from an operation lever (a shift lever) of the manual transmission. Further, the coupling structure may be used in not only vehicles but also various work machines.

What is claimed is:

1. A coupling structure coupling a first member having a sleeve portion and a second member having a shaft portion configured to be fitted in the sleeve portion, the coupling structure comprising a coupling member formed by bending a wire and including:

(A) a pair of first and second engaging portions extending in parallel to each other and respectively engaging a pair of slots defined with the sleeve portion, each of which extends in a circumferential direction of the sleeve portion and which are opposed to each other with an axis of the sleeve portion interposed therebetween;

(B) a connecting portion connecting one end of the first engaging portion and one end of the second engaging portion, which one ends are diagonally opposed to each other, the connecting portion extending from the one end of the second engaging portion toward the other end of the first engaging portion so as to surround the first engaging portion for connecting the one end of the second engaging portion and the one end of the first engaging portion;

wherein the connecting portion includes a first-engaging-portion-side connecting portion extending transverse to the first engaging portion in a direction opposite the second engaging portion, an intermediate portion extending transverse to the first-engaging-portion-side connecting portion, and a second-engaging-portion-side connecting portion extending from the intermediate portion to the second engaging portion; and (C) an extending portion extending straight from the other end of the second engaging portion toward the one end of the first engaging portion, wherein:

the coupling member is configured such that the first and second engaging portions are fitted into a circumferential groove formed in an outer circumference of the shaft portion through the slots in a state in which the slots and the circumferential groove are positioned relative to each other, for coupling the sleeve portion and the shaft portion so as to be rotatable relative to each other;

the coupling structure is configured to enable the first member and the second member to be uncoupled from each other by rotating the coupling member with respect to the sleeve portion while elastically deforming the coupling member, so as to disengage the coupling member from the circumferential groove, and the extending portion has a length so designed as to overlap the first-engaging-portion-side connecting portion and prohibit a distal end thereof from getting into the circumferential groove even when the coupling member excessively rotates and the extending portion accordingly engages one of the slots.

2. The coupling structure according to claim 1, wherein the connecting portion of the coupling member has a protruding portion that protrudes in a direction intersecting a plane including the pair of first and second engaging portions and the extending portion.

3. The coupling structure according to claim 2, wherein the protruding portion is formed so as to protrude in a direction in which the axis of the sleeve portion extends.

4. The coupling structure according to claim 1,
wherein the coupling structure links (a) an operation input shaft which is one constituent element of a transmission of a vehicle and which is configured to be rotatable and (b) an operation member for operating the transmission, by coupling: a cable end, as the first member, provided at one end of a cable having the other end connected to the operation member; and a lever, as the second member, extending from the operation input shaft in a radial direction thereof,
wherein the sleeve portion is provided at the cable end so as to extend in a direction intersecting the cable,
wherein the shaft portion is provided at a distal end of the lever so as to extend upright, and
wherein the coupling member is configured to couple the sleeve portion of the cable end and the shaft portion of the lever.

5. The coupling structure according to claim 1, wherein the first engaging portion, the second engaging portion and the connecting portion lie substantially within a single plane.

6. The coupling structure according to claim 5, wherein the intermediate portion protrudes away from the single plane and is configured to protrude in a direction of an axis of the sleeve portion.

7. The coupling structure according to claim 1, wherein the intermediate portion extends substantially parallel to the first engaging portion, and the second-engaging-portion-side connecting portion extends parallel to the first-engaging-portion-side connecting portion.

8. The coupling structure according to claim 7, wherein the intermediate portion protrudes away from the single plane and is configured to protrude in a direction of an axis of the sleeve portion.

\* \* \* \* \*